Jan. 5, 1926.
P. L. ORMISTON
1,568,913
COMPRESSION GAUGE
Filed August 7, 1924
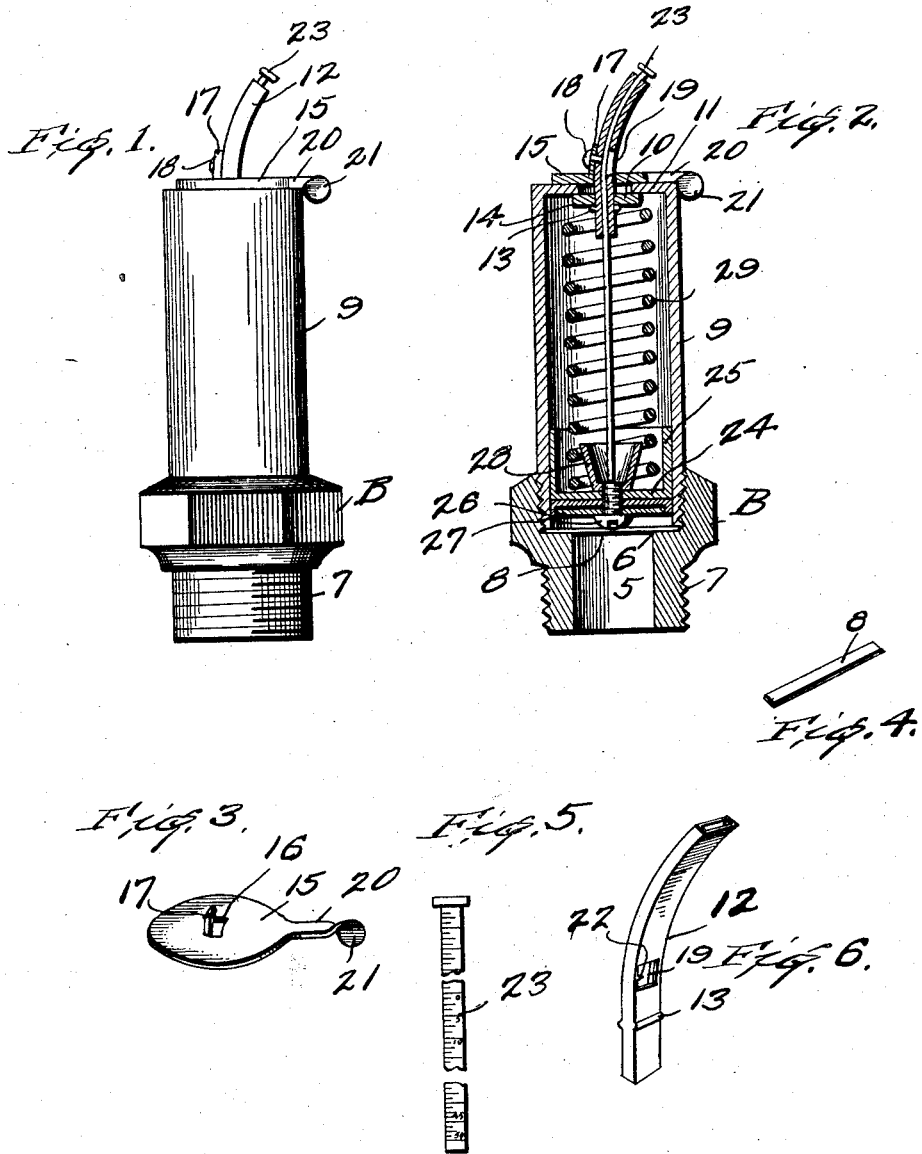
Witness
Inventor
Perley L. Ormiston
By
Attorney Patented Jan. 5, 1926.

1,568,913

UNITED STATES PATENT OFFICE.

PERLEY L. ORMISTON, OF PORTLAND, OREGON.

COMPRESSION GAUGE.

Application filed August 7, 1924. Serial No. 730,697.

*To all whom it may concern:*

Be it known that I, PERLEY L. ORMISTON, a citizen of the United States, residing at Portland, in the county of Multnomah and State of Oregon, have invented certain new and useful Improvements in Compression Gauges, of which the following is a specification.

The present invention relates to an improvement in compression gauges of that type designed particularly for use in explosive engines such as those of the internal combustion type, and adapted in such use to indicate the maximum pressure of compression of the cylinder with which the gauge is used.

The improved gauge is designed to visually indicate the maximum compression of the particular cylinder, and to this end is adapted to receive the gases from the cylinder under the compression stroke and to indicate the amount of such pressure.

An important object of the invention is to provide a gauge of this nature which will accurately indicate the compression obtained in an engine cylinder and in which the indicating stem is held in any position to which it has been moved by the pressure so that it may be read at leisure.

Another very important object of the invention is to provide a device of this nature which is positive in action, and which is not liable to get out of order easily.

Another important object of the invention is to provide a gauge of this nature which may be utilized to advantage in motors provided with overhead valve mechanism, the device being constructed so that it will not be interfered with by said overhead valve structure.

A still further very important object of the invention is to generally improve upon compression gauges of this type by providing a device possessing a very simple and efficient construction, one which is reliable in operation, inexpensive to manufacture, durable, strong, easy to manipulate, and otherwise well adapted to the purpose for which it is designed.

With the above and numerous other objects in view as will appear as the description progresses, the invention resides in certain novel features of construction, and in the combination and arrangement of parts as will be hereinafter more fully described and claimed.

In the drawing:

Figure 1 is an elevation of the compression gauge embodying the features of my invention, Figure 2 is a longitudinal section taken therethrough, Figure 3 is a detail perspective of the plate at the outer or upper end of the gauge, Figure 4 is a detail fragmentary view of the pliable bar for indicating the pressure, Figure 5 is an elevation thereof, and Figure 6 is a detail perspective of the indicating bar guide conduit.

Referring to the drawing in detail wherein like reference numerals refer to similar parts throughout the several views it will be seen that the base B is in the form of a nipple having a bore 5. The base B is internally threaded at its upper end and then reduced so as to form an annular shoulder 6. External threads 7 are provided at the bottom end of this base. A cross piece 8 rests on the annular shoulder 6 and acts as a stop as will be clear as the description proceeds. A cylinder 9 provided with an upper closed end and a lower open end has external threads on its open end so as to be receivable in the threaded portion of bore 5 of the base nipple B. An opening 10 is provided in the closed end 11 of the cylinder 9 in order that the guide conduit 12 may extend therethrough. This guide conduit 12 is of an elongated curved formation and is preferably rectangular in cross section having a rectangular shaped bore therein. Shoulders 13 are provided on the exterior surfaces of the conduit adjacent its lower end and an inner plate washer 14 receives the conduit with these shoulders in abutment therewith as is clearly illustrated in Figure 2 when the device is assembled. The outer plate washer 15 is provided with a rectangular shaped opening 16 formed by the lip 17 which is struck therefrom and then bent upwardly. The conduit passes through the opening 16 and the lip 17 is held in engagement therewith by means of a screw 18. An orifice 19 is provided in the conduit above the outer plate washer 15. The plate washer 15 may be rotated for turning the conduit by means of a radially extending handle which terminates in a gripping portion 21 by being twisted, said gripping portion extending slightly over the side of the cylinder 9. An indicating lug 22 extends inwardly from one edge of the orifice 19 and cooperates with the indicia provided on the pliable bar 23 which is slidable through the curved guide conduit 12.

A piston 24 is slidable in the cylinder 9 and the body thereof is provided with the skirt 25. A gasket or washer 26 is held on to the bottom face of the body of the piston 24 by means of a screw 27 which also engages the bottom of a conical shaped cup 28 disposed within the confines of the skirt 25. A helical spring 29 is positioned within the cylinder 9 and its ends are in contact with the closure 11 and the body of the piston 24 thereby normally holding this piston at the bottom of the cylinder 9 adjacent the base nipple B so that the screw 27 is in abutment with the stop piece 8. This prevents the washer 26 which is preferably of the flexible type made out of leather or rubber or any other suitable material from coming into contact with the shoulder 6 of the base nipple B thereby preventing premature destruction thereof which would otherwise be caused by the spring 29 forcing the piston to the bottom of the cylinder when the pressure is released.

The body portion of the base nipple is preferably in the form of a hexagonal nut whereby the external threaded portion 7 thereof may be easily threaded into the spark plug opening of a cylinder. When the device is thus assembled with a cylinder and the engine is turned over the compression of the cylinder will be registered by this device as the piston will be raised compressing the spring 29 and forcing the pliable indicating bar 23 through the curved guide conduit and the pressure will be indicated by that portion of the indicia on the bar which is in registry with the indicating lug 22 in the orifice 19 of the guide conduit 12. When the compression in the cylinder is relieved by the opening of the exhaust valve the spring 29 will force the piston back to its initial position with the screw 27 in abutment with the stop piece 8. However, the pliable bar will remain in its position to which it has been forced upon the upward movement of said piston thus indicating the maximum of the compression. This bar 23 is thus retained in its position because of its pliable nature and the curvature of the guide conduit. When it is desired to again use the gauge the pliable bar is forced downwardly into the cylinder and the cup 28 acts as a guide so as to properly center the inner terminal of the bar on the piston.

After the device has been screwed into the head of the cylinder block provided with overhead valve mechanism the outer plate washer 15 may be rotated so as to rotate the guide conduit in order that it may curve outwardly to one side of the block or in any other position so that when the pliable bar 23 is forced to an extended position it will not engage any of the overhead valve mechanisms.

It is thought that the construction, operation, and advantages of the invention will now be clearly understood without a more detailed description thereof. While the preferred embodiment of my invention has been described in detail, it will be understood that I do not wish to be limited to the particular construction set forth, since various changes in the form, material, proportions, and arrangement of parts, and in the details of construction may be resorted to without departing from the spirit or scope of the invention or destroying any of the advantages contained therein, heretofore described and defined in subjoined claims.

Having thus described my invention, what I claim as new is:

1. A pressure gauge of the class described including a cylinder having a pressure inlet at one end, a piston slidable in the cylinder, yieldable means for normally pressing the piston toward said one end of the cylinder, a resilient flexible bar movable through one end of the cylinder and having one end engaging said piston, a guide carried by the cylinder and cooperating with the bar for flexing the same so that the bar will be frictionally retained in any position to which it is moved by the piston.

2. A compression gauge of the class described including a cylinder having a pressure inlet at one end, a piston slidable in the cylinder, a spring yieldingly pressing the piston toward said one end of the cylinder, a resilient flexible indicating bar slidable into and out of the cylinder and having one end engageable with the piston to be actuated thereby, a curved guide carried by the cylinder, said bar being slidable through said guide in order that it will be flexed for being retained in any position to which it is moved by the piston.

3. In a compression gauge of the class described, a cylinder having a pressure inlet at one end, a piston movable in the cylinder, a spring to yieldingly press the piston toward said one end of the cylinder, a curved guide in the other end of the cylinder, and a pliable indicating bar slidable through the guide and having one end engaging the piston so as to be movable by the latter.

4. In a compression gauge of the class described, a cylinder having a pressure inlet at one end, a piston movable in the cylinder, a spring to yieldingly press the piston toward said one end of the cylinder, a curved guide in the other end of the cylinder, a pliable indicating bar slidable through the curved guide and having one end engaging the piston, said guide being provided with an orifice at one side thereof, and said pliable bar being provided with indicating indicia which may be read through the orifice of the guide.

5. In a compression gauge of the class described, a cylinder having a pressure inlet at one end, a piston movable in the cylinder, means for yieldingly pressing the piston normally toward said one end of the cylinder, a curved guide carried by the other end of the cylinder, an indicating bar having one end engaged with the piston so as to be moved out of the cylinder thereby for indicating the pressure in the cylinder of an engine, and means for rotating the guide and the indicating bar.

6. In a compression gauge of the class described, a cylinder having a pressure inlet at one end, a piston movable in the cylinder, a spring associated with the piston to press it normally toward said one end of the cylinder, a guide rotatably mounted in one end of the cylinder and projecting outwardly of the latter, means for rotating the guide, and an indicating bar slidable through the guide and having one end engaged with the piston.

7. In a compression gauge of the class described, a cylinder, a piston slidable in the cylinder, a spring associated with the piston and the cylinder to press the former toward one end of the latter, a pliable indicating bar movable into and out of the cylinder and having one end engaging the piston so as to be moved by the latter, and means carried by the cylinder for curving and rotating the pliable bar.

8. In a compression gauge of the class described, a cylinder having a pressure inlet at one end, a piston slidable in the cylinder, a spring cooperating with the piston to normally press it toward one end of the cylinder, said cylinder being provided with a partially closed end, a curved guide conduit passing through the partially closed end of the cylinder, a washer plate in the cylinder and carried by the guide conduit, a second washer plate on the outside of the partially closed end of the cylinder and fixed to the guide conduit, and a pliable indicating bar slidable in the guide conduit and having one end engaging the piston.

9. In a compression gauge of the class described, a cylinder having a pressure inlet at one end, a piston slidable in the cylinder, a spring cooperating with the piston to normally press it toward one end of the cylinder, said cylinder being provided with a partially closed end, a curved guide conduit passing through the partially closed end of the cylinder, a washer plate in the cylinder and carried by the guide conduit, a second washer plate on the outside of the partially closed end of the cylinder and fixed to the guide conduit, and a pliable indicating bar slidable in the guide conduit and having one end engaging the piston, and an arm carried by the second named washer plate for facilitating rotation of the guide conduit.

In testimony whereof I affix my signature.

PERLEY L. ORMISTON.